United States Patent
Milanovic

(10) Patent No.: US 10,113,478 B2
(45) Date of Patent: Oct. 30, 2018

(54) TURBOCOMPOUND ASSEMBLY, IN PARTICULAR IN THE FIELD OF INDUSTRIAL VEHICLES

(71) Applicant: FPT MOTORENFORSCHUNG AG, Arbon (CH)

(72) Inventor: Dragoljub Milanovic, St. Gallen (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 45 days.

(21) Appl. No.: 15/105,512

(22) PCT Filed: Oct. 29, 2014

(86) PCT No.: PCT/EP2014/073212
§ 371 (c)(1),
(2) Date: Jun. 16, 2016

(87) PCT Pub. No.: WO2015/090700
PCT Pub. Date: Jun. 25, 2015

(65) Prior Publication Data
US 2016/0319734 A1    Nov. 3, 2016

(30) Foreign Application Priority Data

Dec. 20, 2013 (EP) ...................... 13198840

(51) Int. Cl.
*F02B 41/10* (2006.01)
*F02B 37/18* (2006.01)
(Continued)

(52) U.S. Cl.
CPC ............ *F02B 41/10* (2013.01); *F02B 37/007* (2013.01); *F02B 37/013* (2013.01); *F02B 37/02* (2013.01);
(Continued)

(58) Field of Classification Search
CPC .......... F16H 47/08; F16H 47/12; F02B 37/02; F02B 41/10; F02B 41/00; F02B 63/04; F02B 37/007; F02B 37/013; F02B 37/18; Y02T 10/163; Y02T 10/144
See application file for complete search history.

(56) References Cited

U.S. PATENT DOCUMENTS 4,843,822 A * 7/1989 Okada ..................... F02B 41/10
                                                          60/614
4,884,407 A * 12/1989 Hatanaka ................ F02B 41/10
                                                          60/614

(Continued)

FOREIGN PATENT DOCUMENTS

DE    3904399       8/1990
DE    3904399 A1 *  8/1990 .............. F02B 41/10
(Continued)

OTHER PUBLICATIONS

International Search Report and Written Opinion for International Application No. PCT/EP2014/073212, dated Jan. 23, 2015, 10 pages.

*Primary Examiner* — Mary A Davis
(74) *Attorney, Agent, or Firm* — Stetina Brunda Garred and Brucker

(57) ABSTRACT

A turbocompound assembly, in particular in the field of industrial vehicles, comprising a power turbine paired with the engine crankshaft, wherein the paring is carried out through said assembly, wherein the assembly comprises a differential arrangement, wherein the pinion of the power turbine defines a sun gear meshing into two or more planet gears, which in turn mesh into a ring gear coupled with the engine crankshaft.

10 Claims, 4 Drawing Sheets

(51) Int. Cl.
    *F02B 37/013*     (2006.01)
    *F16H 47/12*     (2006.01)
    *F02B 37/007*     (2006.01)
    *F02B 41/00*     (2006.01)
    *F16H 47/08*     (2006.01)
    *F02B 37/02*     (2006.01)

(52) U.S. Cl.
    CPC .............. *F02B 37/18* (2013.01); *F02B 41/00* (2013.01); *F16H 47/08* (2013.01); *F16H 47/12* (2013.01); *Y02T 10/144* (2013.01); *Y02T 10/163* (2013.01)

(56) References Cited

U.S. PATENT DOCUMENTS

| | | | | |
|---|---|---|---|---|
| 4,894,992 | A * | 1/1990 | Sekiyama | F02B 41/10 60/624 |
| 7,765,805 | B2 * | 8/2010 | Lofgren | F02B 37/18 123/559.1 |
| 8,495,875 | B2 * | 7/2013 | Triller | F02B 37/10 60/608 |
| 2012/0023939 | A1 * | 2/2012 | Kley | F02B 39/04 60/624 |
| 2014/0075935 | A1 * | 3/2014 | Kley | F02B 41/10 60/605.1 |

FOREIGN PATENT DOCUMENTS

| | | | |
|---|---|---|---|
| DE | 10204066 | 8/2003 | |
| DE | 102011012861 | 9/2012 | |
| JP | 61286531 A * | 12/1986 | .............. F02B 41/10 |
| WO | WO2011009558 | 1/2011 | |
| WO | WO2012110217 | 8/2012 | |

* cited by examiner

TURBOCOMPOUND ASSEMBLY, IN PARTICULAR IN THE FIELD OF INDUSTRIAL VEHICLES

CROSS-REFERENCE TO RELATED APPLICATIONS

The present application claims priority to PCT International Application No. PCT/EP2014/073212 filed on Oct. 29, 2014, which application claims priority to European Patent Application No. 13198840.4 filed Dec. 20, 2013, the entirety of the disclosures of which are expressly incorporated herein by reference.

STATEMENT RE: FEDERALLY SPONSORED RESEARCH/DEVELOPMENT

Not Applicable

FIELD OF THE INVENTION

The present invention relates to a turbocompound assembly, in particular in the field of industrial vehicles.

DESCRIPTION OF PRIOR ART

Turbocompound systems are known since the late 60's.

For example the U.S. Pat. No. 4,100,742 shows a classical turbocompound configuration, wherein a first turbine driving a compressor, while a second turbine, known as power turbine, is geared with the crankshaft in order to help the combustion engine.

A hydrodynamic coupling is commonly used in order to connect the power turbine to the crank train. This type of connection prevents the torsional vibrations of the crank shaft that are magnified by the high gear ratios of the transmission between crank shaft and turbine to affect the turbine.

Moreover, it is necessary to introduce a set of gears, linked to the crank train, for adapting the revolution speed of the power turbine with the revolution speed of the engine crankshaft.

Due to the very high rotational speeds that are involved with these pinions and bearings it is necessary to manufacture these transmission with very tight dimensional tolerances, in the order of single digit micrometers.

SUMMARY OF THE INVENTION

The main object of the present invention is to provide an improvement in the design of a turbocompound assembly, for connecting the power turbine with the crankshaft.

The main principle of the invention is that the power turbine shaft is coupled with the engine crankshaft, or crank train if further gears are present, through a differential device, where a pinion clamped directly on the power turbine shaft defines the sun of said differential device and the ring gear of said differential device is coupled with the engine crankshaft.

The differential device is known also with other expression, such as Epicyclic gearing or plate drive.

Advantageously, according to a preferred embodiment of the invention, the seats for the three components that are involved in the most critical dimensional pairings, are all integrated into one single metallic body, and can be machined all in one single clamping. These three components are the delicate bearing cartridge of the power turbine shaft, the fast revving pinions geared to the power turbine shaft, the heavy power input side of the hydrodynamic coupling.

The pinion on the turbine shaft is the sun gear; the ring gear is an integral part of the coupling and the planets connect these two to form a planetary gear set. The power turbine portion of the hydrodynamic clutch has a cylindrical shape having an inner annular gear and defining an axial symmetry and a corresponding symmetry axis. Therefore, the power turbine shaft lies on said symmetry axis and his pinion engages simultaneously said two or more gears, that, in turn, engage said inner annular gear. Thus, said two or more gears define planet gears, and the inner annular gear defines the ring of the planetary arrangement.

Preferably, the other portion of the hydrodynamic clutch, namely the portion designed to be coupled with the crank train has a closed basis having a second shaft, lying on said symmetry axis and provided with a pinion.

Therefore, a first object of the present invention is a turbocompound assembly.

A further object of the present invention is a vehicle comprising said turbocompound assembly.

These and further objects are achieved by means of the attached claims, which describe preferred embodiment of the invention, forming an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION OF THE PREFERRED EMBODIMENTS

Figure 1:
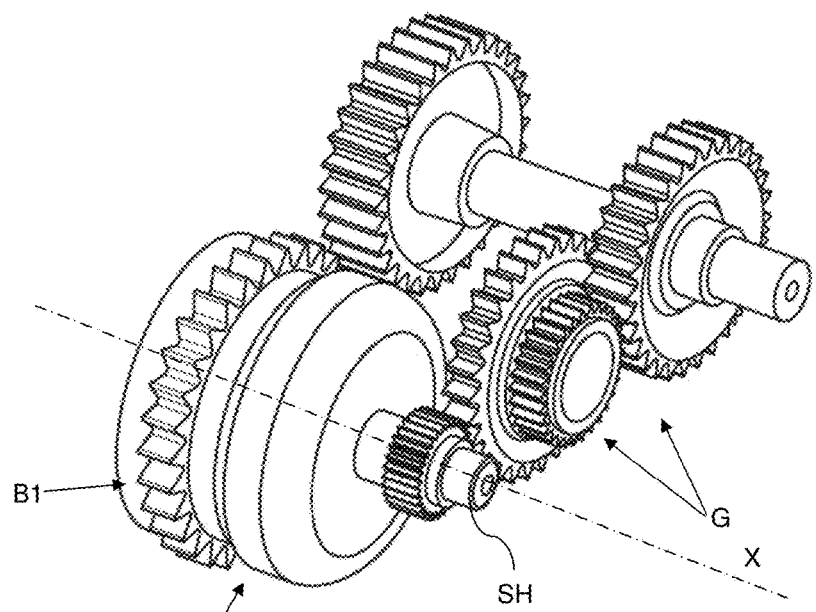
FIG. 1 shows a first view of the turbocompound assembly of the present invention.
Figure 2:
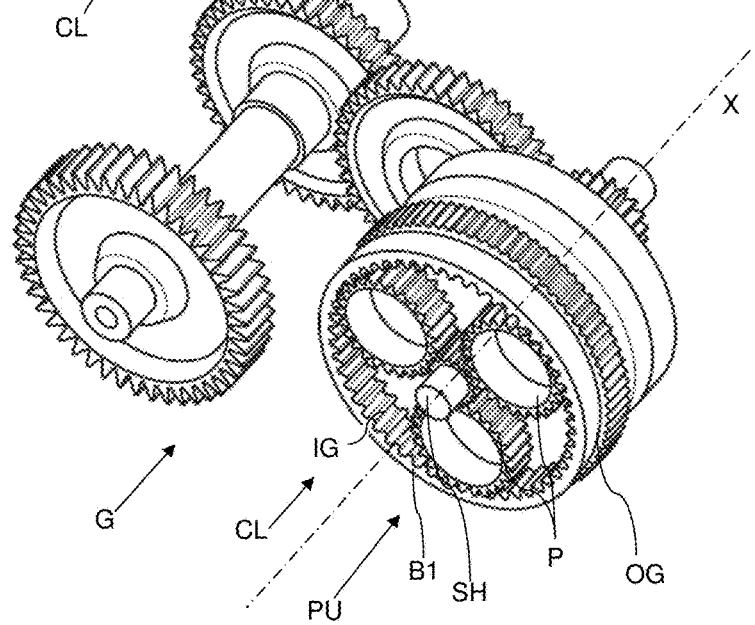
FIG. 2 shows a second view of the details of FIG. 1.

The assembly CL, according to FIGS. 1 and 2, comprises a cylindrical body B1, defining a development axis X and an corresponding axial symmetry.

Within the body B1 is arranged a differential arrangement, wherein the pinion of the power turbine PT defines a sun gear S meshing into two or more planet gears P, which in turn mesh into a ring gear IG coupled with the engine crankshaft.

Figure 3:
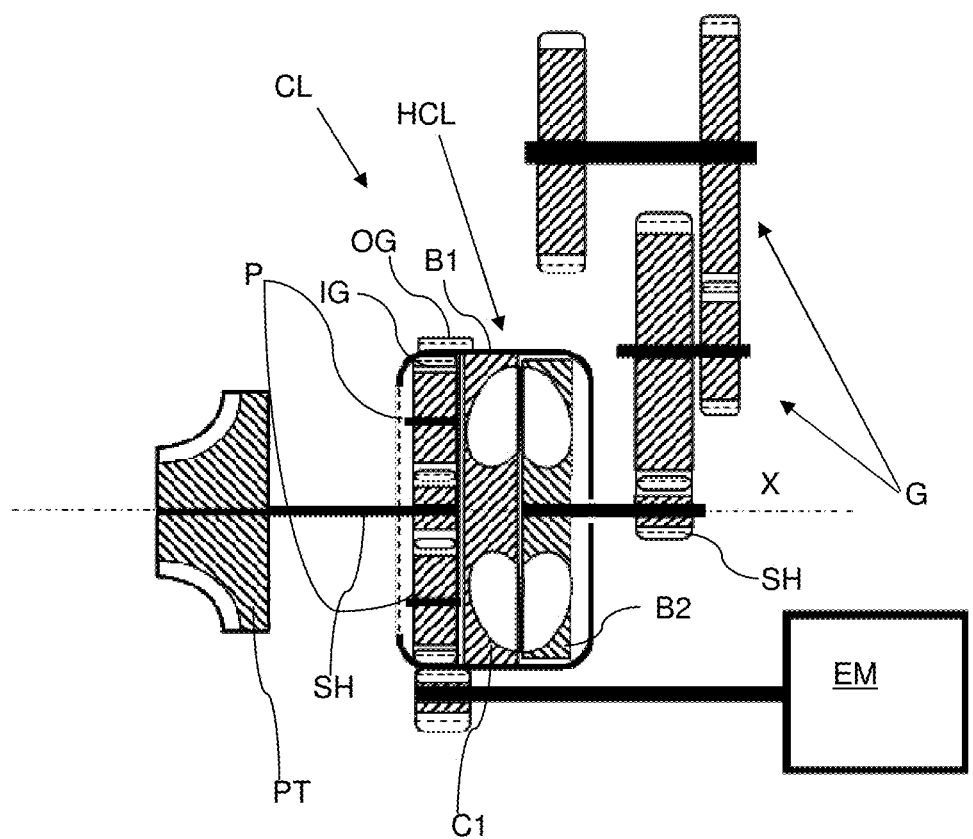
FIG. 3 shows a schematic sectional view of the turbocompound assembly of previous figures.

The ring gear, according to FIGS. 2 and 3 is integral part with the body B1. Preferably, said ring gear is internally arranged as a meridian of the body B1.

Therefore, the power turbine shaft SH lies on said symmetry axis X and his pinion engages simultaneously two or more gears P that, in turn, engage said inner annular gear IG. Thus, said two or more gears define planet gears, radial arranged with respect to the sun S.

A carrier (not shown in FIGS. 1-3) maintains planet gears P angularly equally spaced.

Within the body, preferably, is also arranged a hydrodynamic clutch HCL, thus the ring gear IG is coupled with the engine crankshaft through said hydrodynamic clutch HCL.

The hydrodynamic clutch HCL comprises a first C1 and a second component B2 rotatably joined between each another according the development axis X, the latter defining a symmetry axis for the differential assembly.

The first component C1 is fixed with the interior of said body B1, while the second component B2 is fixed with the shaft SH, that is suitable to be coupled with the engine crankshaft.

The shaft SH is provided with an annular gear, operatively paired with the crank train G, optional, for cooperating in adapting the power turbine speed with the crank shaft speed. Therefore, the second portion B2 is designed to be stably connected with the crankshaft K, through the crank train G if present.

The shaft S of the power turbine can comprise a bearing. According to a preferred embodiment of the invention, said bearing is integrated within said support B5. Or, alternatively, the body itself defines a bearing for the power turbine shaft.

Figure 4:
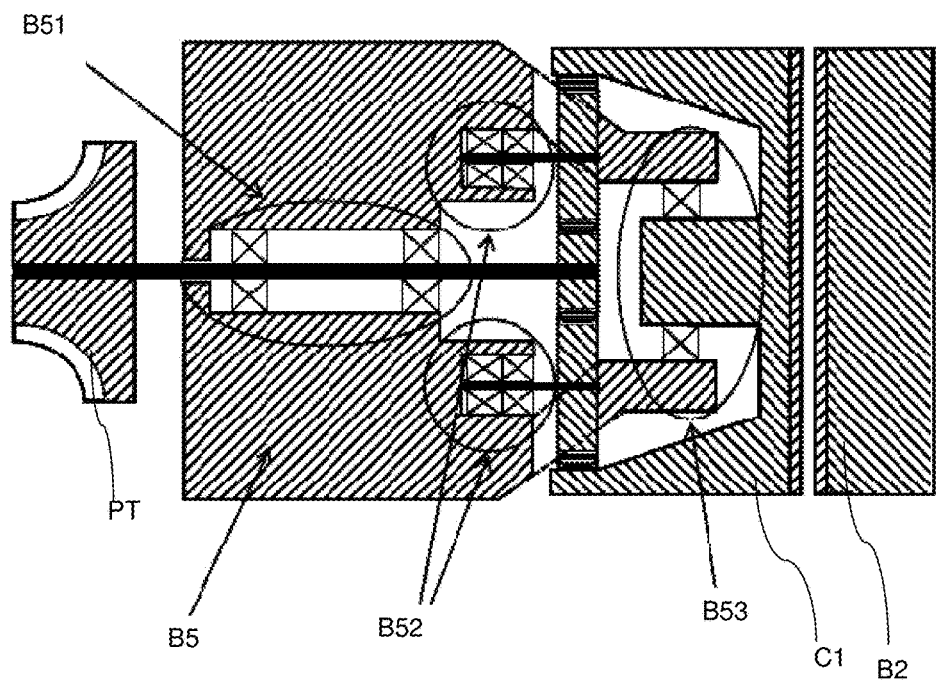
FIG. 4 shows a schematic sectional view of another embodiment of the turbocompound assembly according to the present invention.

According to another preferred embodiment of the invention, disclosed on FIG. 4, the support B5 not only supports the power turbine shaft bearing B51, but also defines a carrier B52 for the planets P as well as for the bearing B53 for the input side of the hydrodynamic coupling respectively for the ring gear that is integrated in that coupling.

Thus, a single body can comprise not only the Epicyclic assembly and the hydrodynamic coupling, but also the power turbine shaft bearing. The power turbine support B5 is operatively fixed, while the body B1 (not shown in FIG. 4) rotates motored by the Epicyclic assembly. The second component B2 of the clutch, instead is fixed with the body B1 and the first component C1 according to its oil pressure as in any known hydrodynamic coupling.

On FIG. 4 is shown the support B5 having an annular shape with a coaxial bearing B51 for the power turbine shaft S, and eccentric bearings B52 for the planet gears P, parallel with the power turbine shaft S.

The support B5, preferably, protrudes through the free space between the planets P, by interpenetrating with the portion B1/C1 of the assembly defining another rotatable interface with it, in particular another annular/coaxial bearing B53.

Being the first component C1 of the hydrodynamic coupling integral and fixed with the body B1, said rotatable interface can be obtained directly on the free face of the first component of the hydrodynamic clutch.

Although, in FIG. 4 is not shown the shaft SH, it is fixed with the portion B2 as shown in FIG. 3.

Advantageously, one single body encloses a differential device, a hydrodynamic clutch and a power turbine bearing.

Figure 5:
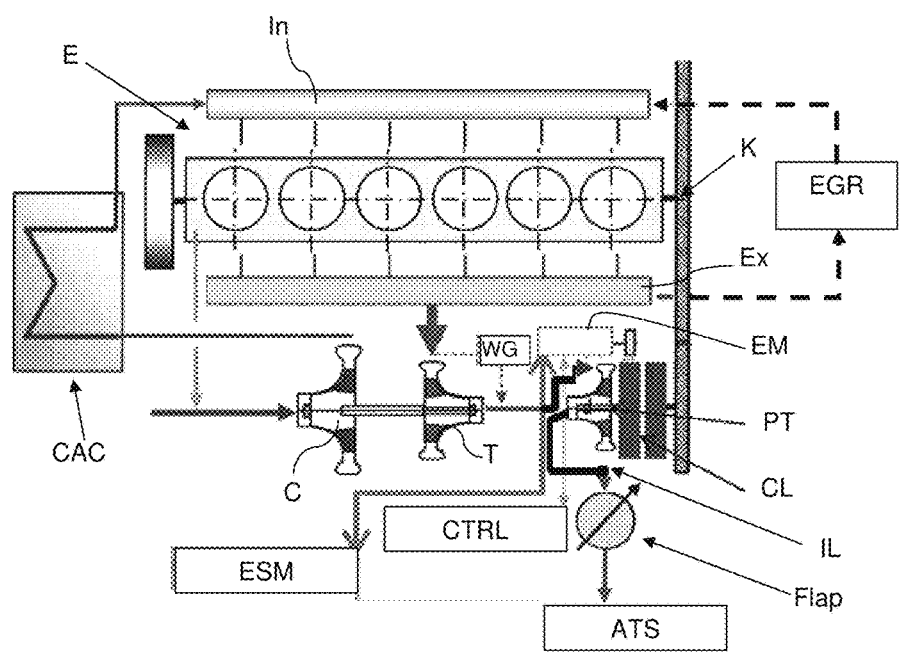
FIG. 5 shows turbocompound scheme implementing the turbocompound assembly of the previous figures.

Preferably, the single body B1 has a cylindrical shape, both internally and externally defining said axial symmetry X and has a further annular outer gear OG suitable to be paired with a power source or a load EM as shown on FIG. 5.

IMPLEMENTATION EXAMPLE

According to FIG. 5 a combustion engine E, for example Diesel type, has an intake manifold In and an exhaust manifold Ex. A turbocharger unit T, C defines a first supercharging stage (optional), having the first turbine T operatively connected immediately downstream of the exhaust manifold Ex. The compressor C, driven by the first turbine T, sucks fresh air from the ambient, compresses it, while the intercooler unit CAC cools the compressed air before entering into the intake manifold In.

An EGR system and a waste gate valve WG can be implemented. In addition, the power turbine can be a variable geometry type.

A power turbine PT is arranged on the exhaust gas line IL, downstream said first turbine T, if present, according the flow of the exhaust gasses.

Such power turbine is coupled with the engine crankshaft K through the turbocompound assembly disclosed above.

It follows that the power turbine is stably paired with an electric motor EM. The electric motor is electrically connected with means for storing electric energy ESM that could be of any type.

Control means CTRL control the operation of the clutch and of the electric motor EM.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. A turbocompound assembly, in particular in the field of industrial vehicles comprising a power turbine paired with an engine crankshaft, wherein said paring is carried out through said turbocompound assembly, the assembly comprising:
   a differential arrangement, wherein the pinion of said power turbine defines a sun gear meshing into two or more planet gears, which in turn mesh into a ring gear coupled with the engine crankshaft;
   a hydrodynamic clutch so that said ring gear is coupled with the engine crankshaft through said hydrodynamic clutch; and
   a body encloses said hydrodynamic clutch and said ring gear and said body are formed from a single piece of material.

2. The turbocompound assembly according to claim 1, wherein said hydrodynamic clutch comprises a first and a second components rotatably joined between each another according an axis, the latter defining a symmetry axis for the differential arrangement and wherein said first component is stably fixed with said body and said second component is integral with a shaft suitable to be coupled with the engine crankshaft.

3. The turbocompound assembly according to claim 2, further comprising a power turbine shaft support, wherein said ring gear, said power turbine shaft support, a carrier of said planet gears are all seated in said body.

4. The turbocompound assembly according to claim 3, wherein said power turbine shaft support defines said planet gear carrier.

5. The turbocompound assembly according to claim 3, wherein said single body has a cylindrical shape, both internally and externally defining said axial symmetry.

6. The turbocompound assembly according to claim 1, wherein said differential arrangement has a further annular outer gear suitable to be paired with power source or load.

7. A turbocompound system having a power turbine, driven by the exhaust gasses of a combustion engine, paired with a crank train through a turbocompound assembly according to claim 1.

8. The turbocompound system according to claim 7, further comprising an electric motor/generator (EM) or an expander, geared with the power turbine through an annular outer gear.

9. The turbocompound system according to claim 7, wherein the combustion engine includes:
   a first turbocharger system, wherein a first turbine drives a fresh air compressor,
   the power turbine arranged downstream of said first turbine, operatively coupled with said engine crankshaft through said hydrodynamic clutch and said crank train.

10. An industrial vehicle comprising a turbocompound system, according to claim 7.

\* \* \* \* \*